Dec. 10, 1935.  E. D. TILLYER  2,023,907
OPHTHALMIC LENS
Filed Dec. 31, 1932
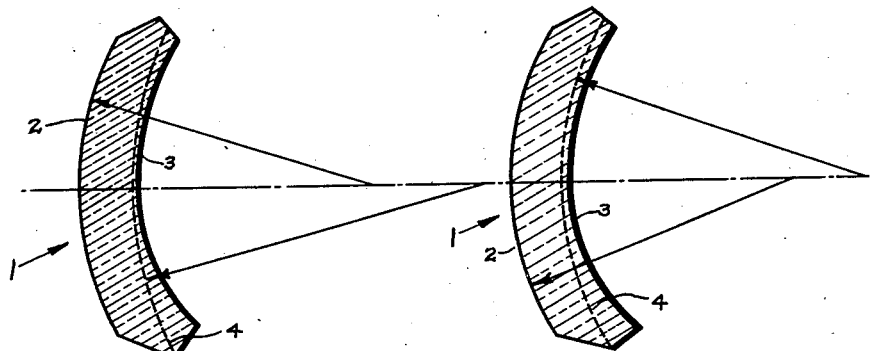
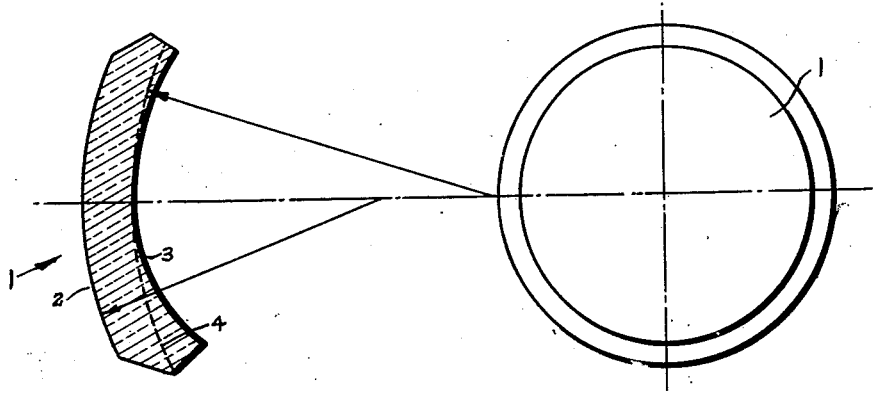
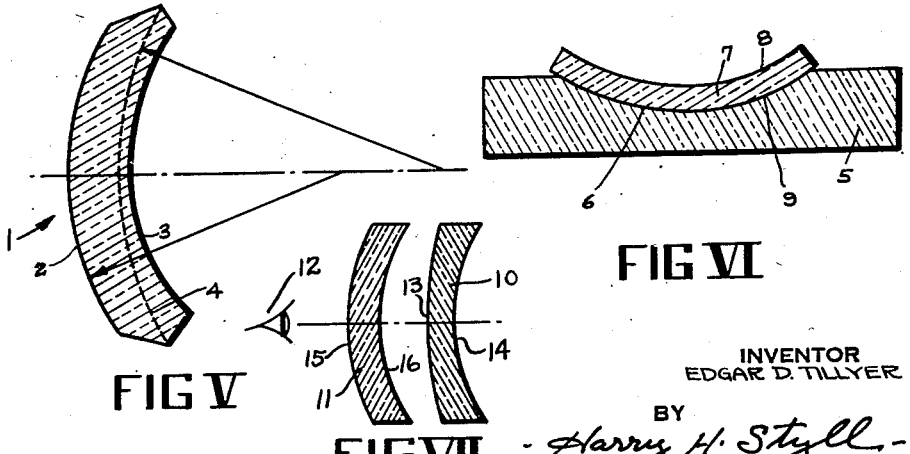
INVENTOR
EDGAR D. TILLYER
BY
Harry H. Styll
ATTORNEY Patented Dec. 10, 1935

2,023,907

UNITED STATES PATENT OFFICE 2,023,907

OPHTHALMIC LENS

Edgar D. Tillyer, Southbridge, Mass., assignor to American Optical Company, Southbridge, Mass., a voluntary association of Massachusetts Application December 31, 1932, Serial No. 649,735

4 Claims. (Cl. 88—54)

This invention relates to improvements in lenses and to an improved process of making the same.

One of the principal objects of the invention is to provide a lens made of one piece of lens medium and having incorporated therein in combination with other optical corrections an optical correction for changing the size of image without changing the focus thereof and an improved process for producing this result.

Other objects and advantages of the invention will become apparent from the following description taken in conjunction with the accompanying drawing. It will be apparent that many changes may be made in the arrangement of parts, the details of construction and the steps of the process without departing from the spirit of the invention as expressed in the accompanying claims. I therefore do not wish to be limited to the exact arrangements shown and described as the preferred forms only have been shown by way of illustration.

Referring to the drawing:

Fig. I is a front view of a lens embodying the invention.

Fig. II is a cross section thru a lens embodying the invention the convex surface of which is spherical and the concave surface aspheric.

Fig. III is a view similar to Fig. II in which the convex surface is toric and the concave atoric.

Fig. IV is a view similar to Fig. II in which the convex surface is toric and the concave aspheric.

Fig. V is a view similar to Fig. II in which the convex surface is spherical and the concave atoric.

Fig. VI is a cross section through a refractory block and lens thereon illustrating a step in the process of manufacture of the lens, and Fig. VII is a diagrammatic cross section of a lens system embodying an optical correction for change in size of image without change of focus.

Up until recently lenses for the correction of vision embodied the correction for sphere, cylinder, and prism, one, two, or all combined. Where they were all combined in one lens the cylinder curve was placed on one side, the sphere on the other and the prism obtained by decentration. It has been found however that there is also an error of magnification in the eye, that is, one eye may see larger than the other eye, or a single eye may have a difference of magnification in different meridians. Correction for this defect, which is usually found in combination with other or others of the well known errors, was accomplished by making the lens in two separated lens elements, one element carrying the old corrections, and the second element the correction for magnification. This magnification correction had to be made without change of focus of the image. If this lens were placed before the eye with the convex surface nearest the eye the image would be decreased, if reversed it would appear larger. These lenses due to their steep curves and separation were bulky, clumsy, heavy and of an ungainly appearance to such an extent as to make them impracticable for use. It is therefore the principal object of my invention to make a lens, and to provide a process for making it, that insures a completed lens that does not possess these disadvantages but that will be unitary, neat, and not unduly heavy.

Referring to the drawing in which similar reference characters denote corresponding parts throughout:

In Fig. VII I have shown an elementary lens of two parts designed to change the size of image without change of power. The eye is shown at 12. The element 10 is the ordinary prescription lens having the surfaces 13 and 14 designed in the usual prior art way for corrections of sphere, cylinder and prism, one, all or any. The element 11 is the element that provides the change in size of image without change of power. It has the surfaces 15 and 16 arranged as follows:

The relationship of the surfaces 15 and 16 is such as to provide no optical power but a magnification. These surfaces may be flat, spherical, aspherical or cylindrical. The amount of change in size depends upon the curvatures of the two surfaces and the thickness of the element. Where change in size of the two major meridians is desired spherical surfaces are used; when change in one meridian only is desired, cylindrical surfaces are used. Such a lens element as is well known produces size change without power change. In such a lens element the two surfaces, in order to produce no optical power, are nearly concentric. When the concave side of the element 11 is placed nearest the eye the size of image is increased; when the convex side of the element 11 is nearest the eye the size of the image is decreased. The desired change in size is obtained by the relationship of the two surfaces of the element and the thickness thereof by well understood optical rules. The magnification in a no optical power element is due to the bending or curving of the element. If an object is viewed through a plane parallel, the effect of this plane parallel is small. If, however, we bend the plane parallel as happens when it is ground on different base curves, a magnification will be produced. The element 11 is so curved or bent to give desired magnification.

For description of lenses of this nature see article entitled "Lenses for changing the size and shape of dioptric images" by Ames, Glidden and Ogle of the department of research in physiological optics, Dartmouth Medical School, Hanover, New Hampshire, contained in a phamphlet reprint from The Annals of the Distinguished Service Foundation of Optometry, Boston, Massachusetts, 1932, page 27.

I make my lens 1 from a single piece of lens medium such as optical glass and calculate the surfaces thereof to include with the regular required corrections the correction for change in magnification without change in focus.

The production of such a lens is now known and described in the prior art. See United States Patent 1,933,578 to Ames et al., November 7, 1933, filed August 13, 1929. This patent describes fully the production of a lens having a size magnification in addition to a focal power where said magnification is independent of the focal power. The formula and calculations are set forth in this patent, and it is explained how the surfaces, and thickness of the lens are arrived at and calculated. Only the axial or central power, however, of the lens is considered.

I first calculate my lens for the central or axial power desired as set forth in the said patent.

The consideration determining these calculations are as follows: First, considering vision thru the center of the lens and disregarding for the moment oblique or marginal vision, the optical consideration is to obtain a power or powers and a magnification without change of focus in one piece of lens medium. In the lens itself there are three things that may be varied; the first side of the lens, the second side of the lens, and the thickness of the lens. In the nature of things the thickness cannot be varied very much, as the lens must not be too heavy. To start I select a good thickness, thus leaving the two surfaces of the lens that may be worked upon to produce the required results and into these I must work my requirements of power correction and magnification.

Having determined the axial or central power of my lens I next proceed to determine whether or not the lens has good marginal or oblique corrections or whether there are present marginal or oblique errors negating the use of my lens in practice.

If it is necessary to correct the oblique or marginal vision there are two more equations to satisfy, namely, the vision in the two meridians of the marginal point. Hence, there are now four things to be taken into account, and only two surfaces to which they can be applied, as the thickness is only variable to a slight extent. Study of these conditions will show that only the central vision with these requirements can be obtained with toric or spherical surfaces, that is, a surface the cross section of which is a circle either of finite or infinite radius.

If the oblique vision is to be corrected there must be a departure from these regular surfaces. The cross section of the surface will have to depart from a circle, which surface I have denoted herein as an aspheric surface.

I then determine whether this aspheric surface will have to be placed on one or on both sides of the lens. These aspheric surfaces are difficult to grind and polish so it is a consideration to use such a curve on one side only of the lens unless results are such as to make the more expensive proceeding advisable.

In Figs. II to V inclusive I have shown cross sections of the lens giving various combinations that may be used. In Fig. II the convex surface 2 is a spherical surface, and the concave surface 3 is an aspheric surface. The dotted line 4 shows a spherical surface and the space between 3 and 4 denotes the departure of the surface 3 from a spherical surface. In Fig. III 2 is a toric surface, that is, a surface that has a difference in curvature in its two major meridians, and the surface 3 is an atoric surface, that is, a surface that departs from a circle in each of its major meridians. In Fig. IV, 2 is a toric surface and 3 an aspheric surface. In Fig. V, 2 is a spherical surface and 3 is an atoric surface.

It is clear that many combinations of different forms of regular surfaces on one side, and aspheric or atoric surfaces on the other may be made such as sphere, cylinder, prism, toric, plano on one side, aspheric or atoric on the other or atoric or aspheric on both sides or combined with each other, but in such instances the curves are calculated to include the correction for change in magnification without change in focus.

It is clear if an aspheric curve is adopted on one side that an extra variable has been introduced and if on both sides, then two extra variables have been found which give a total of four, and a partial one in the variation in thickness, so that the four equations may be satisfied. The only surfaces permissible are smooth continuous unfolded curves, as those with sharp corners etc. cannot be used. With this introduction of additional variables good oblique vision can be obtained with practically perfect central vision.

In calculating the lens surfaces the central vision is first calculated in the two major meridians and then the oblique vision on a marginal spot in the two major meridians. The spherical surfaces are calculated by the usual trigonometric formula well known to the mathematical lens designers of the prior art as set forth in various text books on the subject. The aspheric computation in general must be made by an algebraic expression of the departure of that surface from a sphere such as found in standard treatises on aspheric curves, with higher expansions if necessary to increase the accuracy. The surfaces are calculated for the desired optical corrections including that of change of magnification without change of focus to produce the required mathematical curves to produce the required result. In general it will be endeavored to place the aspheric surface on one side of the lens only, with the curvatures equal in the two major meridians. Departures are only made where the desired results require the use of both lens surfaces or both meridians of one surface.

The following references may be consulted on the computation of aspheric surfaces and the production of aspheric lens surfaces:

Über Asphärische Flächen In Optischen Instrumenten, by Allvar Gullstrand, printed by Almquist & Wiksells Boktryckeri A-B., 1919.

Untersuchungen Zur Geometrischen Optik, by K. Schwarzschild, printed by Druck der Dieterich'shen Univ.-Buchdruckerei in Göttingen 1905.

U. S. Patent to Von Rohr No. 949,501, February 15, 1910.

Having determined the amount of marginal or oblique errors of my lens by the prior art methods described above, I next calculate a lens surface of the aspheric type described above, by the prior art methods also described above that will correct or neutralize these errors and give a lens of the required power, and size magnification required without material marginal or oblique errors. I then preferably place on one side of the lens first the calculated aspheric surface as described below and then at the calculated thickness place the other surface of the lens as obtained from my first calculation of the power and magnification of the lens for central or axial power. If the surface is regular and not aspheric it is ground and finished like the prior art regular lenses.

One method of producing an aspheric surface is illustrated in Fig. VI where 5 is a refractory block having the depression 6 therein. The lens blank is indicated by 7. The blank 7 initially has parallel surfaces. The top surface 8 is a finished lens surface; the lower surface 9 is also preferably a finished lens surface. The depression 6 is made to the conformation of the desired aspheric surface. The blank is rested on the block over the depression 6, heat is then applied until the blank softens and drops down into the depression 6. As it is a well known property of glass that under heat the surfaces will maintain their parallel relationship when dropping, the surface 8 will take the aspheric shape of the folded surface 9. This gives a finished optical surface of the desired conformation. After cooling the molded blank is removed and a finished optical surface ground and polished on the face 9, where the surface 9 is to be a regular nonaspheric lens surface.

The production of aspheric or deformed surfaces by other methods have been accomplished in the prior art, and such surfaces have been made commercially. My aspheric surfaces may also be made by these methods.

It will be noted that the departure from a sphere has been shown in the drawing as making a steeper curve on the margin. This departure may be flatter at the margin than it is at the center; in fact, the flatter form is perhaps more common than the steeper departure from the spherical curve.

From the foregoing it will be seen that I have provided an improved lens and an improved process for making the same well adapted to carry out all the objects of the invention and to obtain its advantages.

Having described my invention I claim:

1. The method of making a one piece ophthalmic lens comprising first calculating the thickness and lens surfaces of a lens system for a lens of one piece of lens material having a required central or axial power and a required additional size magnification, said additional size magnification being a function of the thickness of the lens and its bent or cupped shape, then calculating the marginal or oblique errors of said lens system, then calculating an aspheric or deformed surface to replace one of the originally calculated surfaces, said surface to retain the original magnification and power but to substantially remove the said marginal errors, and then finishing the surfaces of the lens to calculated thickness, all but one of said surfaces being originally calculated surfaces and the other the said calculated aspheric or deformed surface.

2. The method of making an ophthalmic lens comprising first calculating the thickness and lens surfaces of a lens for a required central or axial power and a required additional size magnification, then calculating the marginal or oblique errors of said lens, then calculating an aspheric or deformed surface to replace an originally calculated surface to retain the original magnification and power but to substantially remove the said marginal errors, placing a finished optical surface on one face of a piece of lens medium, dropping the side opposite the finished surface in a mold under heat, said mold having the configuration of the calculated aspheric surface, then finishing the side opposite the finished surface to the configuration of the calculated surface opposite the said aspheric surface, and to the calculated separation of the two surfaces.

3. The method of making a one piece ophthalmic lens comprising first calculating the thickness and lens surfaces of a lens system for a lens of one piece of lens material having a required central or axial power and a required additional size magnification, said additional size magnification being a function of the thickness of the lens and its bent or cupped shape, then calculating the marginal or oblique lens errors of said system, then calculating aspheric or deformed surfaces to replace the originally calculated surfaces, said surfaces being designed to retain the original magnification and power but to substantially remove the said marginal errors, and then finishing the surfaces of the lens to calculated thickness, the said surfaces being the said calculated aspheric or deformed surfaces.

4. A one piece ophthalmic lens having a calculated thickness to give a required axial refractive power and a required size magnification and finished optical surfaces on its two faces, the curvatures of the two faces being related by the bent or cupped shape of the lens to produce the required magnification for said thickness and the said surfaces also being related to give the required axial refractive power, and also a marginal refractive power substantially the same as that of the axial refractive power, one at least of said surfaces having an aspheric curvature.

EDGAR D. TILLYER.